Nov. 20, 1934.  M. G. TORSON  1,981,008
ICE CREAM FREEZING TRAY
Filed Dec. 8, 1931   2 Sheets-Sheet 1
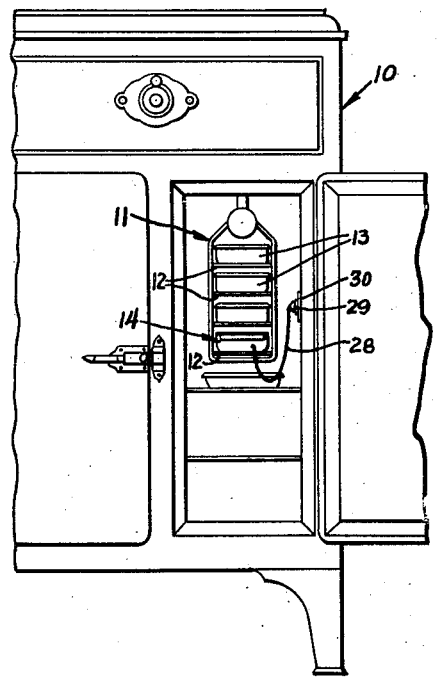
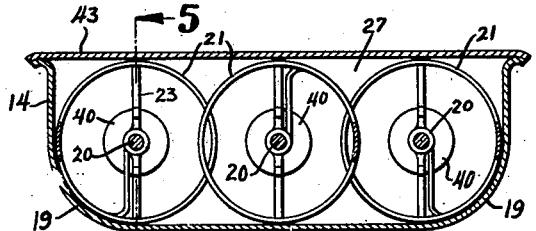
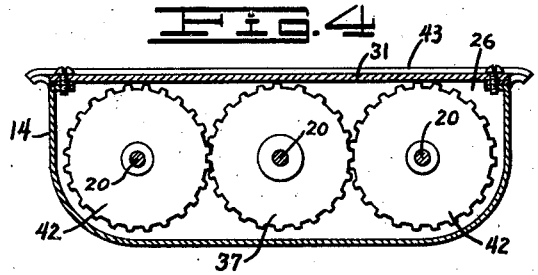
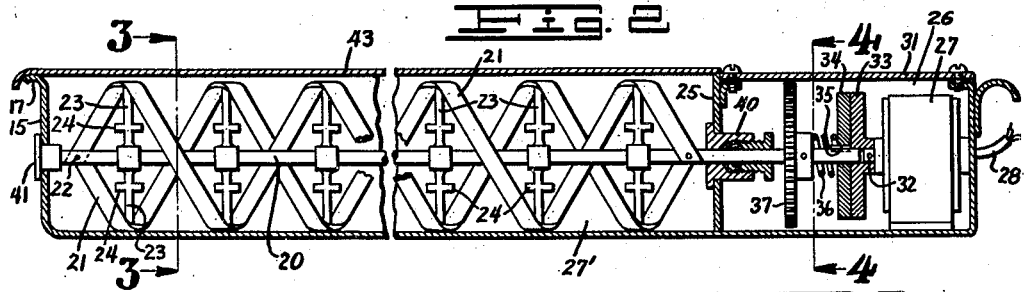
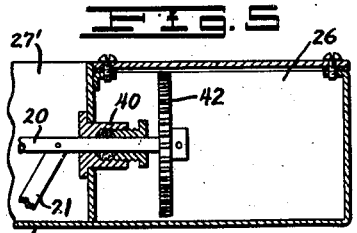
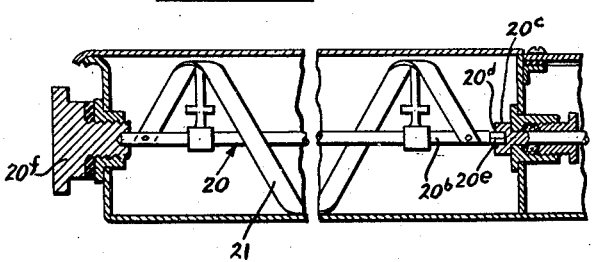
INVENTOR.
MARTIN G. TORSON.
BY
ATTORNEY.

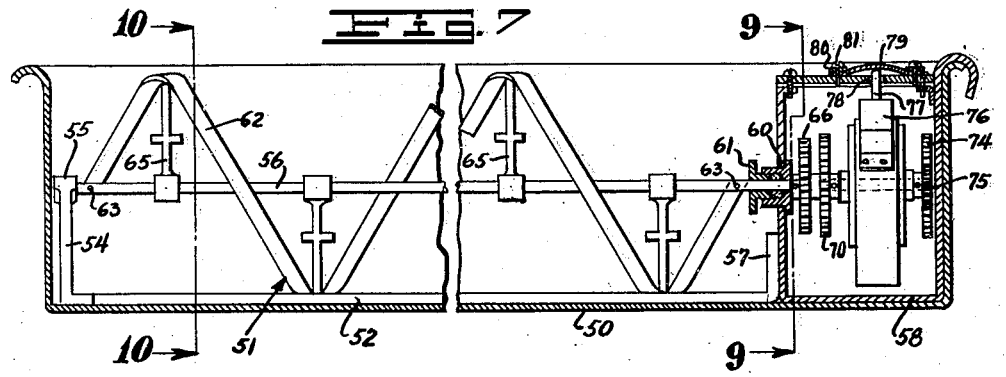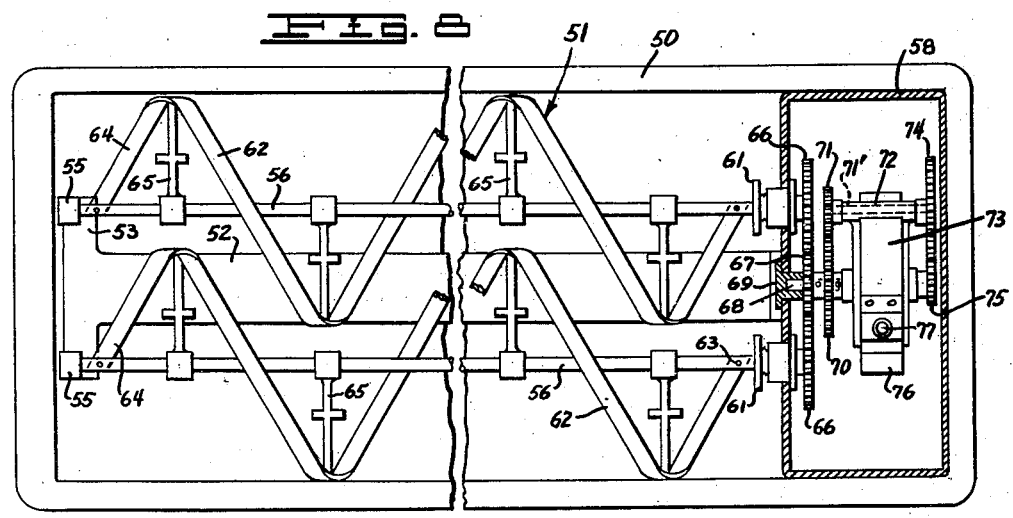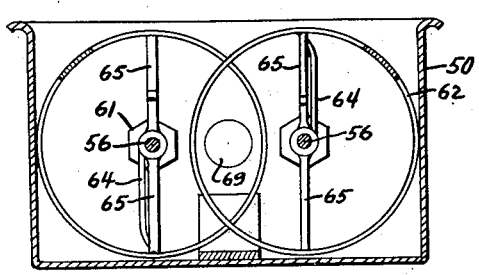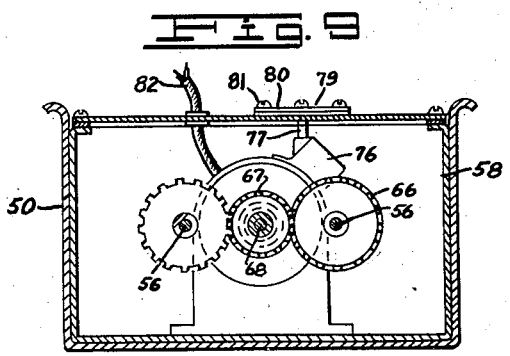

Patented Nov. 20, 1934

1,981,008

UNITED STATES PATENT OFFICE 1,981,008

ICE CREAM FREEZING TRAY

Martin G. Torson, Kansas City, Mo.

Application December 8, 1931, Serial No. 579,733

3 Claims. (Cl. 259—110)

This invention relates to refrigerator trays.

The general object of the invention is to provide a tray for use in iceless refrigerators wherein the tray has means therein for stirring its contents while the latter is freezing.

A further object of the invention is to provide a freezing tray with built-in means for stirring the contents.

A further object of the invention is to provide a freezing tray having stirring means thereon and wherein a suitable motor drive is provided for actuating the stirring means.

Another object of the invention is to provide a freezing tray for iceless refrigerators having stirring means therein, and including means for operating the stirring means, and wherein when the material being frozen has reached the desired viscosity the stirring means will cease operating.

A further object of the invention is to provide a freezing tray having stirring means therein and wherein a motor is provided on the tray for actuating the stirring means.

A further object of my invention is to provide a refrigerator tray having a motor built thereon and wherein a removable stirring means is contained in the tray.

Another object of the invention is to provide a tray with a combined motor and stirring means which is removable as a unit.

Other objects of the invention will be apparent from the following description taken in connection with the drawings wherein:

Fig. 1 is a fragmentary view of a refrigerator showing my invention.

Fig. 2 is a central sectional view through a tray embodying the features of my invention.

Fig. 3 is a section on line 3—3 of Fig. 2.

Fig. 4 is a section on line 4—4 of Fig. 2.

Fig. 5 is a section on line 5—5 of Fig. 3.

Fig. 6 is a fragmentary section similar to Fig. 2 showing the removable stirring means.

Fig. 7 is a central sectional view of a modified tray.

Fig. 8 is a top plan partly in section showing the modified tray.

Fig. 9 is a section on line 9—9 of Fig. 7, and

Fig. 10 is a section on line 10—10 of Fig. 7.

Referring to the drawings, I have indicated my invention as designed for use with a refrigerator indicated fragmentarily at 10. This refrigerator may be electrically or gas operated and may be of any desired character so long as it contains a freezing chamber or similar compartment indicated at 11.

As is customary with refrigerators of this character, the freezing compartment includes spaced shelves 12 on which trays indicated generally at 13 may be disposed.

It has heretofore been customary to place water which it is desired to freeze in these trays and it has also been the practice to place custards, ices, salads, etc., in these trays for the purpose of chilling the contents. Various efforts have been made to prepare milk products such as ice cream in these freezing compartments, but on account of the inability to stir or agitate the contents while they are freezing, the product has been more or less granular or flaky and the results produced have not been entirely satisfactory so far as making ice cream and similar products is concerned.

According to my invention, I build into the trays 13 which may be removably mounted in the freezing compartment, a stirring device, and provide means associated with the trays for operating this stirring device.

In the accompanying drawings, I have illustrated one member of my invention which is shown as comprising a tray indicated generally at 14, which has an end 15, a bottom 16, an upper edge 17 and a removable lid 18. This tray may be of any desired configuration, although I prefer that it have rounded corners as indicated at 19.

Mounted within the tray I arrange one or more shafts 20. I have here shown three of these shafts, although it may be understood that more or less may be employed as desired. Mounted upon each shaft I show a pair of flexible metal stirring members 21 which are preferably helical in shape and secured by fastening members such as pins 22 arranged at each end thereof and secured to the shafts 20. The shafts 20 may have radial members 23 thereon to engage the stirrers 21 and brace them and also to serve as beaters. The diameter of these helical members is such that the end ones approach close to the curved corners 19 and thus scrape the material from these corners and the center ones approach close to the bottom 16 and scrapes the frozen product from the bottom. The members 23 also have beaters 24 thereon.

The tray is shown as provided with a partition 25 forming a compartment 26 in which a motor 27 is mounted and an ice cream compartment 27′.

This motor 27 includes leads 28 which may have a suitable plug 29 on the end thereof and which may be plugged into a suitable outlet 30 which may be arranged within the refrigerator 10. The compartment 26 is provided with a cover 31.

The armature shaft 32 of the motor is provided with a disc 33 pinned thereon while the adjacent end of the shaft 20 has a companion disc 34 slidably secured thereto by a key 35.

The disc 34 is slidable along the shaft 20, being normally held in engagement with the disc 33 by a spring 36, one end of which engages the hub of a gear 37 secured to the center shaft 20. This gear is arranged adjacent to the head 38 of a packing nut and bearing 39 which is secured to a companion packing gland and bearing 40. The two packing members surround and support one end of the shaft 20 and also serve to prevent any grease or other material from passing into the tray. The other end of the shaft 20 is supported in a bearing 41.

The outer shafts 20 are supported in bearings similar to the bearings 38, 40 and 41.

The gear 37 secured to the center shaft 20 engages companion gears 42 secured on the end of the outer shafts 20 so that all these shafts are driven when the motor 27 operates.

In operation the compartment 26' is filled with the desired ingredients and the tray is placed in one of the shelves 12. A cover 43 is placed on the tray. The cover may be secured in any desired manner or it may be held in place by the bottom of the shelf just above it. The motor 27 is then started and the refrigerator door 44 closed. While the material is being frozen the motor will operate the stirrers 21 causing the material to freeze smoothly. When the material congeals the difficulty of turning the stirrers will cause the disc 28 to rotate independently of the disc 29 so that there will be no breakage of the stirring members due to the torque of the motor becoming more severe when the congealing has reached a certain point.

In Fig. 6 a slight modification is shown wherein the shaft 20 is divided into two parts 20a and 20b. The part 20a is provided with an enlarged head 20c and this head has a rectangular socket 20d to receive a rectangular head 20e on the portion 20b. At the free end the shaft 20b fits in a removable threaded plug 20f arranged in the wall of the tray. As a result of this construction the plug 20f may be removed, thus allowing the head 20c to be moved out of the socket 20d thereby allowing the stirring member 21 to be removed without delay.

In Fig. 7 I show a modification of my invention, wherein a tray 50 is employed. This tray 50 may be similar in shape to the tray 14 previously described. Within the tray, I provide a stirring unit indicated generally at 51. This unit includes an elongated base 52 having arms 53 at one end and on these arms I arrange upstanding members 54 which terminate in bearings 55. These bearings support one end of shafts 56 which are spaced about as shown.

At the other end the base 52 is provided with an upstanding member 57 which is secured to a housing 58 which is provided with a cover 59. The housing 58 is provided with apertures 60 through which combined bearings and packing glands 61 extend. The combined bearings and packing glands 61 support the other ends of the shafts 56 as clearly shown in the drawings.

Mounted upon the shafts 56 I arrange stirring members 62 which are secured to the shafts by pins 63. These stirring members are spiral in form except the end portions 64 which extend substantially radial towards the shafts 56.

The stirring members 62 are supported by radial brace members 65 which are secured to the shaft. The stirring members are provided with beaters to cause thorough agitation of the ice cream or other material while it is being frozen. The stirring members overlap as shown but the shafts may be spaced to avoid this overlapping if desired.

Secured to each of the shafts 56 within the housing 58 I provide a gear 66 each of which mesh with a gear 67 secured to a stud shaft 68 which is rotatably mounted in a bearing 69. Also secured to the stud shaft 68 I provide a gear 70 which is secured to a shaft 71 mounted in a bearing 72 which is shown as integral with the casing of an electric motor 73. Secured to the shaft 72 adjacent the end opposite the gear 70 I provide a gear 74 which meshes with a gear 75 secured to the armature shaft of the motor 73.

From the foregoing it will be apparent that when the motor 73 is started it will, through the medium of the gear train just described, drive the shafts 56 and thereby rotate the stirring members 62.

The motor 73 is shown as adapted to be controlled by an overload switch 76 which may be of any desired type having a reset arm 77. I have shown the reset arm 77 as having vertical movement and extending through an aperture 78 provided in the cover 59. Surrounding the aperture 78 and extending thereover I provide a flexible rubber diaphragm 79 which is retained in position by a metal ring 80 secured to the lid 59 by screws 81.

The overload switch 76 is also used for a starting switch.

In operation a suitable mixture to make ice cream or other frozen products is placed in the tray 50 and the tray is placed in the freezing compartment such as compartment 11 of the refrigerator 10 shown in Fig. 1. The motor 73 is then operatively connected to a source of electrical energy by suitable wires 82. The operator then presses down on the rubber diaphragm 79 and the reset lever 77 of the overload switch 76 which resets the switch 76 and starts the motor 73 to rotate the stirring members 62.

When the substance in the tray 50 freezes to a point where too great a load is being put on the motor the overload switch throws out and breaks the circuit to the motor whereupon the stirring members cease to rotate.

From the foregoing description it will be apparent that I have invented a novel refrigerating tray which can be economically manufactured and which is highly efficient in use.

Having thus described my invention, what I claim is:

1. In a freezing device, the combination of a tray adapted to be inserted in a freezing compartment and a stirring element removably positioned in said tray, said stirring element comprising a housing, a support secured to and extending from said housing, a motor arranged in said housing, a stirring member rotatably mounted on said support and means connecting said stirring member and said motor whereby the latter drives the stirring member.

2. For use in an open top freezing tray, a stirring element comprising a compartment having a motor therein, a closure for said compartment, a support secured at one end to said compartment and having a free end projecting there-from, said support being adapted to engage the bottom of said open top tray, said support at the free end including an upstanding arm, a stirring element including a shaft mounted on said arm, said element being exposed for rotation in a tray and means connecting said motor and said stirring element whereby the motor operates said stirring elements.

3. For use in an open topped freezing tray a housing, a base member secured to said housing, said base member extending from said housing, a plurality of spaced bearings on said base adjacent the end thereof opposite said housing, a plurality of shafts rotatably mounted in said bearings, stirring members on said shafts, said shafts extending into said housing, means on said housing to support said shaft and means to pack around said shafts to prevent leakage of fluid into said housing, a gear on each of said shafts in said housing, an electric motor in said housing having a gear on the armature shaft thereof, a spaced reduction gear train connecting said motor gear and said gears on said shafts, an overload switch in said housing adapted to control said motor and means to reset said overload switch from the exterior of said housing.

MARTIN G. TORSON.